United States Patent [19]

Jung et al.

[11] 4,252,967

[45] Feb. 24, 1981

[54] DIHALONEOPENTYL SILICATE FLAME RETARDANTS

[75] Inventors: Alfred K. Jung, Ridgewood; Michael Turczyk, Yonkers; Edward D. Weil, Hasting-on-Hudson, all of N.Y.

[73] Assignee: Stauffer Chemical Company, Westport, Conn.

[21] Appl. No.: 50,246

[22] Filed: Jun. 20, 1979

[51] Int. Cl.$^3$ .................. C08G 65/34; C08G 77/02
[52] U.S. Cl. ........................ 528/425; 260/45.7 R; 260/45.75 B; 260/45.75 W; 260/45.95 R; 260/45.95 G; 556/449; 556/443; 556/464
[58] Field of Search ............... 528/425; 260/448.8 A

[56] References Cited

U.S. PATENT DOCUMENTS

| | | | |
|---|---|---|---|
| 1,178,731 | 4/1916 | Knorr et al. | 260/448.8 |
| 3,133,111 | 5/1964 | Wheeler | 260/448.8 |
| 3,218,271 | 11/1965 | Wong et al. | 260/448.8 |
| 3,342,898 | 9/1967 | Roselli | 260/448.8 |
| 3,455,980 | 7/1969 | Frye | 260/448.8 |

*Primary Examiner*—Harold D. Anderson
*Attorney, Agent, or Firm*—Roger S. Benjamin

[57] ABSTRACT

Dihaloneopentyl silicates are solid compositions formed by esterification of silicon halides or silicate esters with dihaloneopentyl glycol. These compositions are useful as flame retardants in plastic formulations.

20 Claims, No Drawings

DIHALONEOPENTYL SILICATE FLAME RETARDANTS

BACKGROUND OF THE INVENTION

It is recognized that compounds containing halogen are among those effective for imparting flame resistance to flammable substrates. In particular, many organic bromine compounds are known agents for compounding flame retardant plastics, especially in combination with an antimony synergist. Brominated organic compounds of various types display different strengths and weaknesses. For example, polybrominated aromatic compounds have good thermal stability but tend to discolor in light. In contrast, aliphatic bromine compounds have good light stability but only moderate thermal stability.

The requirements for a suitable flame retardant extend beyond the sole ability to impart flame resistance. A flame retardant suitable for plastics must be highly compatible with its base material not only under conditions of use but at the stage where the plastic material is being compounded.

The environment of temperature and shear forces present in modern plastic milling equipment render some flame retardant compounds unsuitable because of instability, volatility, or a tendency to remain separate from the base plastic during compounding. The result is often a nonhomogenous product with unacceptable flame retardant characteristics.

It is desirable to develop new flame retardant agents which are effective, stable and easily compounded into plastic base materials processed in conventional equipment.

THE INVENTION

This invention is a group of novel dihaloneopentyl silicate compositions. These compositions are prepared by the esterification of silicon halides or silicate esters with dibromoneopentyl glycol or monobromochloroneopentyl glycol. Dibromoneopentyl silicate, a preferred composition of this invention is a solid polymer containing about 58 weight percent bromine and having a melting with decomposition range of 265° C. to 285° C.

Another aspect of this invention are plastic formulations rendered flame retardant by the inclusion of the novel dihaloneopentyl silicate compositions of this invention. A particularly preferred group of plastics are styrenic plastics containing flame retardant effective amounts of dibromoneopentyl silicate and antimony synergist.

DETAILED DESCRIPTION OF THE INVENTION

The flame retardant compositions of this invention designated, "dihaloneopentyl silicates", are polymeric solids having high melting points and halogen content of at least 50 weight percent.

The major portion of the dihaloneopentyl silicate is believed to be a cross-linked polymer represented by the generic formula:

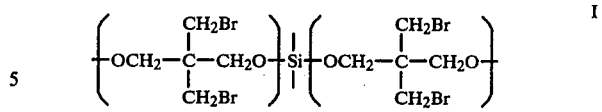

some ring structures such as:

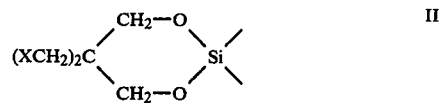

and;

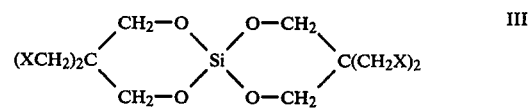

may be present together with linear end groups such as:

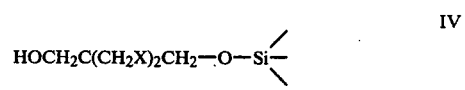

wherein for formulae, I, II, III, and IV the symbol X is a halogen selected from bromine or chlorine, with the proviso that on the average at least one-half of the halogen atoms are bromine.

The preferred composition of this invention is dibromoneopentyl silicate. This composition is characterized as a solid of light color, having a bromine content of about 58 weight percent, a melting point not below 220° C., and a melting with decomposition range of about 265° C. to about 285° C. Dibromoneopentyl silicate is insoluble in dimethylsulfoxide, water, dimethylformamide, and chloroform.

The dihaloneopentyl silicates of this invention are synthesized in high yield by two different esterification methods.

METHOD A—TRANSESTERIFICATION

A silicate ester corresponding to the formula:

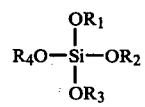

wherein $R_1$, $R_2$, $R_3$, and $R_4$ are independently selected from hydrocarbyl radicals is contacted in a reaction medium with dibromoneopentyl glycol (also designated, 2,2bis(halomethyl) 1, 3 propanediol) or monobromomonochloroneopentyl glycol. Suitable hydrocarbyl radicals include alkyl, alkaryl, aryl, aralkyl, and cycloalkyl. Preferred silicate esters are those wherein the $R_1$, $R_2$, $R_3$, $R_4$ are independently selected from alkyl radicals containing one to twenty carbon atoms. Examples of preferred silicate ester reactants are tetramethyl silicate, tetraethyl silicate, and tetrapropyl silicate. A mixture of silicate esters may be used if desired. The preferred halogenated neopentyl glycol reactant is dibromoneopentyl glycol. A typical transesterification is illustrated by the following chemical equation:

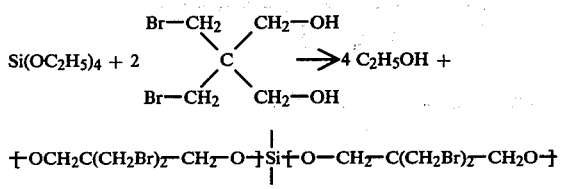

$$+OCH_2C(CH_2Br)_2-CH_2-O+Si+O-CH_2-C(CH_2Br)_2-CH_2O+$$

METHOD B

Silicon halide reactant selected from silicon tetrachloride, silicon tetrabromide, or silicon tetraiodide is contacted in a reaction medium with dibromonenopentyl glycol or monobromomonochloroneopentyl glycol.

One or more silicon halides may be used if desired. Silicon tetrachloride is the preferred silicon halide reactant because of ease of reaction and availability.

Silicon halide is esterified with dihaloneopentyl glycol to yield dihaloneopentyl silicate. An esterification reaction typical of this mode of preparation is illustrated by the chemical equation:

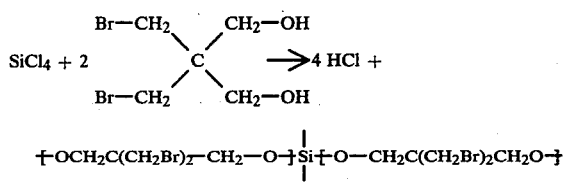

$$+OCH_2C(CH_2Br)_2-CH_2-O+Si+O-CH_2C(CH_2Br)_2CH_2O+$$

Proportions of reactants for either of the described esterification syntheses should be about two moles of the dihaloneopentyl glycol to one mole of either the silicate ester or the silicon tetrahalide. Technical grade dibromoneopentyl glycol containing higher and lower brominated neopentyl glycols is suitable for preparing the compositions of this invention without being deleterious to the esterification or transesterification synthesis. Catalyst is not required for either esterification synthesis but either acid or base catalysts may be employed for assisting the esterification reactions if desired. Examples of acid catalysts are strong inorganic acids such as sulfuric or phosphoric acid. Examples of base catalyst are alkali metal alkoxides such as sodium ethoxide. Reaction temperature is not critical excepting that too low temperatures may give impractically slow synthesis and too high temperatures may thermally degrade a portion of the desired product. Generally, useful reaction temperatures are in the range between 10° C. to 210° C. with temperatures between the limits of 20° C. and 180° C. being preferred. More specifically, the transesterification synthesis with silicate ester is desirably conducted at 120° C. to 160° C., and the esterification synthesis with silicon tetrahalide is desirably conducted at 60° C. to 100° C.

Time of reaction is not critical and usually covers a range of several minutes to several hours. The esterification reactions are run at any convenient pressure, usually ambient atmospheric pressure. The reaction medium may be a solution, suspension or slurry. Where one or more of the reactants are liquids, for example, silicon tetrachloride, tetraethyl silicate, or tetrapropyl silicate, the reaction may be run without a solvent or dispersing media. However, it is sometimes convenient to conduct the esterification reactions in a solvent. The insoluble dihalopentyl silicate precipitates from the solvent medium and is readily separated from dissolved reactants by filtration or decantation. Examples of suitable solvents are chlorinated hydrocarbons such as chloroform or trichloroethane.

Vigorous agitation is an advantageous addition to carrying out the described esterification methods.

Times and temperature effective to esterify silicon tetrahalides or transesterify silicate esters with dihaloneopentyl glycols can be determined by monitoring the quantity of byproduct evolved during the synthesis.

The byproducts of the reaction are alcohol in the case of the transesterification synthesis (Method A) or hydrogen halide in the case of the esterification synthesis (Method B). Because there is an equilibrium of reactants and reaction products in either synthetic method it is advantageous to remove the byproducts of the reaction to encourage formation of the dihaloneopentyl silicate products.

Byproduct removal is facilitated because the byproducts are usually more volatile than the reactants or reaction products. Thermal fractionation, for example, distillation at subatmospheric pressure may be employed during the course of the reaction to facilitate byproduct removal.

The reaction product (substantially absent byproduct, solvent or unreacted starting materials) is a solidified mass which may optionally be further purified by solvent extraction, volatilization of impurities or other conventional means for removing residual reactants or reaction products.

The esterification and transesterification may be conducted in any suitable vessel equipped with inlets, outlets, agitation means, and temperature control Finally, the dihaloneopentyl silicate composition may be milled to any convenient particle size having utility for compounding in a plastic formulation (e.g., 80 mesh to 325 mesh—U.S. Standard Seive Series).

The novel compositions of this invention may be employed to impart flame retardance to a variety of flammable substrates upon which they are impregnated or adhered. Examples of such substrates are cellulosic materials, textiles, fabric backcoatings, foams, and etc. The dihaloneopentyl silicate flame retardant composition may be applied to substrates by padding, dipping, or spraying as a solution, suspension, emulsion, or melt.

It is a preferred practice of this invention to use dihaloneopentyl silicates as flame retardants for flame retarding plastics.

Examples of plastics which may be formulated with dihaloneopentyl silicate flame retardants are styrenic plastics such as polystyrene, polyamides such as nylon, polyesters such as polyethylene terephthalate, polyolefins such as polypropylene, polyvinylchloride, and polyacrylates such as polymethylmethacrylate.

Styrenic plastics are the most preferred materials for formulation with the flame retardant composition of this invention. Exemplary styrenic plastics are polystyrene, high impact polystyrene, acrylonitrile-butadienestyrene resins, styrene-acrylonitrile resins, polyblends of polystyrene and polyphenylene oxide, and acrylate-styrene-acrylonitrile polymers such as described in U.S. Pat. No. 3,944,631.

The dihaloneopentyl silicate flame retardants may be used alone but are preferably employed in synergistic combination with antimony compounds. A preferred antimony synergist is antimony oxide. The ratio of dihaloneopentyl silicate to antimony synergist is typically such that the flame retarded formulation has a halogen to antimony mole ratio of from about 9:1 to about 1:1.

The dihaloneopentyl silicate compositions of this invention are added to plastics in flame retardant effective amounts. The effective amount of a flame retardant may readily be determined by formulating plastic compositions with several levels of flame retardant and subjecting these samples to standard tests such as the UL-94 Flammability of Plastic Materials Tests of Underwriters Laboratories, Inc.

Typically the dihaloneopentyl silicate is added to the plastic formulation in amounts sufficient to provide between about 5 to about 30 weight percent halogen in the formulated plastic. Antimony synergist such as antimony oxide is typically employed at levels of from zero to about 15 weight percent, and preferably from about 2 to about 12 weight percent of the formulated plastic.

The dihaloneopentyl silicate flame retardants have a desirable combination of properties including both high thermal stability and high light stability (resistance to discoloration). Consequently, it is a preferred practice of this invention to employ dihaloneopentyl silicate as substantially the sole source of bromine in a flame retardant formulation. Optionally, the flame retardant of this invention may be used in combination with any other known flame retardants, particularly organic bromine compounds having flame retardant utility. Nevertheless, the benefits arising from the practice of this invention generally require that approximately at least one-half of the bromine content of a desired flame retardant formulation originate from inclusion of dihaloneopentyl silicate composition.

Examples of flame retardants and smoke suppressants which may be included in formulations containing dihaloneopentyl silicates are decabromodiphenyl oxide, bis(pentabromophenoxy)ethane, bis(tetrabromophthalimide)ethane, tetrabromobisphenol A, hexabromocyclododecane, bis(tribromophenoxy)ethane, octabromodiphenyl oxide, molybdenum oxide and molybdates, zinc oxide and zinc salts, magnesium oxide and carbonate, and alumina trihydrate.

EXAMPLE I

This example illustrates the preparation of dibromoneopentyl silicate.

Part A. Preparation of dibromoneopentyl silicate by a transesterification reaction:

To a one liter resin flask fitted with a stirrer and thermometer was added 520 grams (2 moles) of dibromoneopentyl glycol and 208 grams (1 mole) tetraethyl silicate. The resultant slurry was stirred under nitrogen and the temperature was raised. At 95° C. the slurry yielded a clear yellow solution and 0.5 grams of NaOCH$_3$ was added as a catalyst. At 110° C. an additional 0.5 grams of NaOCH$_3$ was added. The reaction was run at 110° C. for approximately five hours.

At the conclusion of the reaction the flask contents had gelled to a rubbery product. This reaction product was mechanically broken up and heated under vacuum at 125° C. to remove volatile materials and subsequently milled to a fine powder.

The product has a melting with decomposition range of 265° C.-275° C. and a bromine content of 58 weight percent.

Part B. Preparation of dibromoneopentyl silicate by esterification of a silicon tetrahalide:

To a two liter round bottom flask fitted with a stirrer and thermometer was added 1200 ml. of CHCl$_3$ and 520 grams (2 moles) of dibromoneopentyl glycol. The flask was sparged with nitrogen and 169 grams (1 mole) of SiCl$_4$ was added dropwise over a period of three hours. The flask contents were heated to 40° C. for two hours and thereafter refluxed for an additional three hours.

The product was stripped of CHCl$_3$ to yield a solid lumpy product having a bromine content of 56.4 weight percent and a melting with decomposition point of 285° C. The reaction product was subsequently milled to a fine powder.

EXAMPLE II

This example illustrates the use of dihaloneopentyl silicate as a flame retardant in plastic compositions:

Part A. High impact polystyrene (No. 727—product of Foster-Grant Co.) was milled with dibromoneopentyl silicate prepared by the method of Example I, Part A. and antimony oxide in a 2-roll 15.24 cm. by 33.02 cm. Laboratory Mill (product of Farrel Mfg. Co.).

The mill was operated at a front roll temperature of 115.6° C. at 32 RPM and a back roll temperature of 173.9° C. at 42 RPM. The milling was continued for seven minutes after banding of the plastic on the roll.

The milled polystyrene product was white and had a bromine content of 9.28 weight percent. The product was pressed at 215.6° C. into 0.3175 cm. thick plaques suitable for the preparation of test specimens.

Part B. The method of Part A. of this example was followed except that the dibromoneopentyl silicate milled into the impact polystyrene was prepared by the method of Example I, Part B.

Part C. A control sample was prepared by milling 16 weight percent decabromodiphenyl oxide and 4 weight percent antimony oxide into polystyrene using the procedure of Part A. of this Example.

Sample Evaluations:

The plastic compositions prepared in Parts A., B., and C. of this Example were evaluated for flame retardancy by the UL-94 Standard for Tests for Flammability of Plastic Materials for Parts in Devices and Appliances (Underwriters Laboratories Inc., second edition as revised Feb. 1975). The UL-94 test procedure is incorporated herein by reference.

The Table displays pertinent data and the UL-94 Flammability Test results for the samples prepared in this Example:

TABLE

| Sample and Base Polymer | Flame Retardant Additive (wt. %) | UL-94 Burn And Other Criteria[1] | | | | | |
|---|---|---|---|---|---|---|---|
| | | 10 sec. or less | 11 to 30 sec. | Total Burn Time (sec.) | Ignite Cotton | Char | UL-94 Rating |
| Ex. II Part A.- High Impact polystyrene | Dibromoneopentyl silicate (16%) and Sb$_2$O$_3$ (4%) | 10 | 0 | 0 | No | No | V-O |
| Ex. II Part B.- | Dibromoneopentyl | 10 | 0 | 8 | No | No | V-O |

TABLE-continued

| Sample and Base Polymer | Flame Retardant Additive (wt. %) | 10 sec. or less | 11 to 30 sec. | Total Burn Time (sec.) | Ignite Cotton | Char | UL-94 Rating |
|---|---|---|---|---|---|---|---|
| High Impact polystyrene | silicate (16%) and Sb₂O₃ (4%) | | | | | | |
| Ex. II Part C.- High Impact polystyrene | Decabromo-diphenyl-oxide (16%) and Sb₂O₃ (4%) | 10 | 0 | 0 | No | No | V-O |

[1]number of flame applications in each category.

Test Results:

The dihaloneopentylene silicate compositions of this invention are shown to be effective flame retardant additives in plastic formulations in comparison to known flame retardant agents.

While the invention has been described with certain specific examples and illustrative embodiments, it is not intended to be limited thereby except insofar as appears in the accompanying claims.

What is claimed is:

1. Solid dihaloneopentyl silicate prepared by the process of contacting in a reaction medium; (1) dihaloneopentyl glycol selected from the group consisting of dibromoneopentyl glycol and monobromomonochloroneopentyl glycol with, (2) silicate ester represented by the formula:

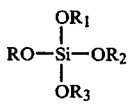

wherein $R_1$, $R_2$, $R_3$ and $R_4$ are independently selected from hydrocarbyl radicals; said contact being at a temperature and for a time effective to transesterify the silicate ester.

2. The product prepared by the process of claim 1 wherein the mole ratio of dihaloneopentyl glycol to silicate ester is about 2 to 1 and the reaction temperature is from about 10° C. to about 210° C.

3. The product prepared by the process of claim 1 wherein the $R_1$, $R_2$, $R_3$, and $R_4$ radicals of the silicate ester are independently selected alkyl radicals containing one to twenty carbon atoms.

4. The product prepared by the process of claim 1 wherein the glycol is dibromoneopentyl glycol.

5. The product prepared by the process of claim 1 wherein a major portion of the alcohol byproduct of the transesterification reaction is removed during the reaction.

6. A solid dihaloneopentyl silicate prepared by the process of contacting in a reaction medium; (1) dihaloneopentyl glycol selected from the group consisting of dibromoneopentyl glycol and monobromomonochloroneopentyl glycol with a silicon tetrahalide selected from the group consisting of silica tetrachloride, silica tetrabromide, and silica tetraiodide, under conditions of temperature and for a time effective to esterify the silicon tetrahalide.

7. The product prepared by the process of claim 6 wherein the mole ratio of dihaloneopentyl glycol to silicon tetrahalide is about 2 to 1 and the reaction temperature is from about 10° C. to about 210° C.

8. The product prepared by the process of claim 6 wherein the silicon tetrahalide is silicon tetrachloride.

9. The product prepared by the process of claim 6 wherein the glycol is dibromoneopentyl glycol.

10. The product prepared by the process of claim 6 wherein a major portion of the hydrogen halide byproduct of the esterification reaction is removed during the reaction.

11. A process for preparing solid dihaloneopentyl silicate by contacting in a reaction medium; (1) dihaloneopentyl glycol selected from the group consisting of dibromoneopentyl glycol and monobromomonochloroneopentyl glycol with, (2) silicate ester represented by the formula:

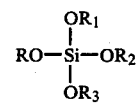

wherein $R_1$, $R_2$, and $R_3$ and $R_4$ are independently selected from hydrocarbyl radicals; said contact being at a temperature and for a time effective to transesterify the silicate ester.

12. The process of claim 11 wherein the mole ratio of dihaloneopentyl glycol to silicate ester is about 2 to 1 and the reaction temperature is from about 10° C. to about 210° C.

13. The process of claim 11 wherein the $R_1$, $R_2$, $R_3$, and $R_4$ radicals of the silicate ester are independently selected alkyl radicals containing one to twenty carbon atoms.

14. The process of claim 11 wherein the glycol is dibromoneopentyl glycol.

15. The process of claim 11 wherein a major portion of the alcohol byproduct of the transesterification reaction is removed during the reaction.

16. A process for preparing solid dihaloneopentyl silicate by contacting in a reaction medium; (1) dihaloneopentyl glycol selected from the group consisting of dibromoneopentyl glycol and monobromomonochloroneopentyl glycol with a silicon tetrahalide selected from the group consisting of silica tetrachloride, silica tetrabromide, and silica tetraiodide, under conditions of temperature and for a time effective to esterify the silicon tetrahalide.

17. The process of claim 16 wherein the mole ratio of dihaloneopentyl glycol to silicon tetrahalide is about 2 to 1 and the reaction temperature is from about 10° C. to about 210° C.

18. The process of claim 16 wherein the silicon tetrahalide is silicon tetrachloride.

19. The process of claim 16 wherein the glycol is dibromoneopentyl glycol.

20. The process of claim 16 wherein a major portion of the hydrogen halide byproduct of the esterification reaction is removed during the reaction.

* * * * *